United States Patent Office 3,301,880
Patented Jan. 31, 1967

3,301,880
3,3-ALKYLIDENE-19-NOR-STEROIDS
Nicolaas Pieter van Vliet, Oss, Netherlands, assignor to Organon Inc., West Orange, N.J., a corporation of New Jersey
No Drawing. Filed Oct. 19, 1964, Ser. No. 404,924
Claims priority, application Netherlands, Oct. 23, 1963, 299,654
5 Claims. (Cl. 260—397.5)

The invention relates to a group of novel 3,3-alkylii-dene steriods and to a process for the preparation thereof.

More particularly, it relates to novel 3,3-alkylidene-steriods of the formula:

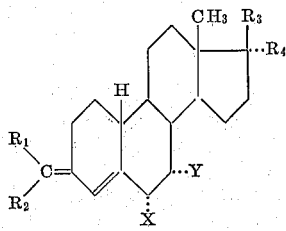

wherein
$R_1$=hydrogen, methyl or ethyl,
$R_2$=hydrogen, methyl or ethyl,
$R_3$=a hydroxyl, acyloxy or alkoxy group,
$R_4$=hydrogen or a saturated or unsaturated hydrocarbon radical with 1–4 carbon atoms, or
$R_3+R_4$=a keto group, and
X and Y=hydrogen or an alkyl group, in which X and Y are not simultaneously hydrogen nor simultaneously an alkyl group.

The above compounds have proved to be most valuable on account of their biological properties, which, although qualitatively generally like those of the corresponding 3-keto-steriods, have advantages over the latter because of lacking undesirable side-effects or to a much lesser degree. The present compounds are important especially on account of their anabolic and oestrogenic properties having no or only a very weak androgenic activity.

These new compounds are prepared by starting from a compound of the formula:

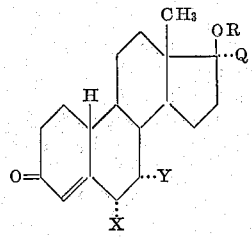

in which
R=hydrogen, an acyl or an alkyl group,
Q=hydrogen or a saturated or unsaturated hydrocarbon radical with 1–4 carbon atoms, and
X and Y having the meaning indicated above
and reacting this compound with a compound of the general formula:

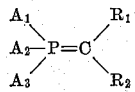

in which
$A_1$, $A_2$ and $A_3$ represent possibly substituted phenyl groups, and $R_1$ and $R_2$ have the meaning indicated above, after which, if desired, the substituents indicated in 17-position are also introduced by any method known per se by etherification, esterification and/or 17-alkylation.

An important group of compounds prepared by the process of the present invention is the group of the general formula:

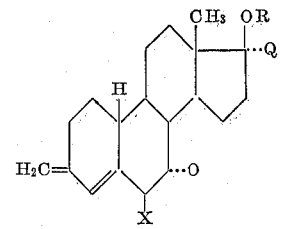

in which
X and Y=hydrogen or a methyl group, in which X is hydrogen if Y is a methyl group and vice versa, and
R=hydrogen or an acyl group derived from an organic carboxylic acid with 1–18 C atoms, and
Q=hydrogen or a saturated or unsaturated alkyl group with 1–4 C atoms.

The in ring B alkylated $\Delta^4$-3-keto-19-nor-steroids to be 17-position have a hydroxyl, acyloxy or etherified hydroxyl group and also may have in 17-position a saturated or unsaturated hydrocarbon radical, are described i.a. in "Steriods," vol. 1, p. 317 (1963) by J. A. Campbell et al. as far as the 7-alkyl-derivatives are concerned and in so far as the 6-alkyl-derivatives are concerned i.a. in the British Patents 884,412 and 885,782.

The phosphine-alkylidene compound to be used as Wittig reagent is in general a triphenyl-phosphine-alkylidene compound possibly substituted in one or more of the phenyl groups.

Usually the reaction is performed with a triphenyl-phosphine-alkylidene, also called alkylidene-triphenyl-phosphorane.

The compounds mentioned before are prepared by reacting the relative triphenyl-phosphine with an alkyl halide for the preparation of the corresponding phos-phoniumhalide, after which this compound is converted into the desired triphenyl-phosphine-alkylidene under the influence of a base.

The reaction proceeds in accordance with the scheme:

The reaction according to the invention can now be performed in such a manner that the relative $\Delta^4$-3-keto-19-nor-steroid is added to the phosphine-alkylidene compound. As the latter compound is unstable, however, and is easily converted under the influence of air or moisture, it is to be preferred to prepare this compound fresh and not to isolate it.

Hence the reaction is usually performed by adding the stereoid or a solution thereof to a mixture of the phos-phonium-halide of the general formula given above $[A_3P\text{---}CHR_1R_2]X$, together with a suitable base in the presence of a suitable organic solvent in the absence of oxygen, e.g. by working in nitrogen atmosphere.

As suitable bases may be mentioned alkali metal compounds of aliphatic, aromatic or aliphatic hydrocarbons, such as butyl lithium, phenyl lithium and triphenylmethyl sodium, alkyl magnesium halide, such as ethyl magnesium bromide, alkali metal amides and alkali metal alcoholates or with dimsyl sodium (reaction product of sodium hydride and dimethyl sulfon oxide).

As solvents may be applied aliphatic ethers, such as dimethyl ether, diethyl ether, dioxane or tetrahydrofurane and aromatic hydro carbons such as benzene or toluene.

The steroid to be used as starting product may have an etherified or esterified hydroxyl group in 17-position, but it is also possible that etherification or esterification takes place only after the introduction of the 3,3-alkylidene group.

The 17-acyloxy group either present already in the starting product or introduced after the Wittig reaction is preferable derived from an organic aliphatic, aromatic or araliphatic carboxylic acid with 1–18 carbon atoms.

As examples of such acids are mentioned: formic acid, acetic acid, propionic acid, butyric acid, valeric acid, capric acid, undecylenic acid, lauric acid, trideylenic acid, myristic acid, pentadecyl acid, oleic acid, stearic acid, arachic acid, behenic acid, lignoceric acid, cerotic acid, mentanic acid, myricinic acid, trimethyl acetic acid, diethyl acetic acid, hexahydrobenzoic acid, cyclopentylpropionic acid, cyclohexyl propionic acid, cyclohexyl butyric acid, citroneilic acid, palmitic acid, erucic acid, benzoic acid, phenyl acetic acid, phenyl propionic acid, phenylbutyric acid, phenylpropiolic acid, malonic acid, succinic acid, glutaric acid, pimelic acid, and tartaric acid.

For the preparation of the 17-esters of the relative alkylidene-steroids with a tertiary 17-hydroxyl group the relative ester may be taken as starting material in the Wittig reaction, but this group may also be introduced after that. In the latter case the acylation should be performed in basic medium as the $\Delta^4$-3,3-alkylidene grouping is sensitive to acid.

The ether group, too, can be introduced after the Wittig reaction, but it is to be preferred to do this first.

The ether group may have been derived from an aliphatic, aromatic or araliphatic hydrocarbon radical. For preference an ether is prepared derived from a lower aliphatic hydrocarbon radical with 1–6 carbon atoms. If the desired steroid has a 17-alkyl group, two methods may be adopted again for the preparation of such a compound, viz. by starting from a 17-alkylated compound or by the introduction of such a group after the Wittig reaction.

The latter conversion is performed by careful oxidation of the in ring B alkylated $\Delta^4$-3,3-alkylidene-17$\beta$-hydroxyoestrene prepared by the process of the invention, e.g. by the Oppenauer method or with chromic acid/pyridine, into the corresponding 17-keto compound, after which this compound can be converted into the desired 17-saturated or unsaturated alkyl-derivative in a known manner by an alkylation reaction.

If the desired final product is a 17$\alpha$-ethinyl compound or in general a compound substituted in 17-position by an unsaturated alkyl group with a terminal ethinyl group, this group is preferable introduced after the Wittig reaction.

The saturated or unsaturated hydrocarbon radical present in the final products in 17-position may be for instance a methyl, ethyl, propyl, isopropyl, butyl, vinyl, propenyl, allyl, methallyl, ethinyl, propinyl, or butinyl radical.

The compounds according to the invention may be administered parenterally or orally in the form of suspensions, solutions or solid pharmaceutical dosage unit forms, such as tablets and pills, usually after having been mixed with other substances.

The invention is further illustrated by the following examples:

*Example 1*

Of a 1.26 N solution of butyl lithium in ether 144 ml. were added to a vigorously stirred suspension of 71.5 g. of triphenyl-methylphosphonium-bromide in 1000 ml. of absolute ether in nitrogen atmosphere. After stirring for 4 hours at room temperature a solution was added of 11.5 g. of 6$\alpha$-methyl-19-nor-testosterone in 800 ml. of absolute ether. Stirring was continued for sixteen hours, after which the ether was distilled off while adding tetrahydrofuran dropwise. The mixture was refluxed for 6 hours, cooled, poured into 5000 ml. of water and extracted with ether. The etherial extract was washed with water and dried. The residue obtained after evaporation of the solvent was taken up in 700 ml. of 70% methanol and extracted with petroleum ether. After washing with water, drying and evaporating of the solvent this extract yielded 4.5 g. of the 3,3-methylene-6$\alpha$-methyl-17$\beta$-hydroxy-$\Delta^4$-oestrene. The thus obtained steroid was dissolved in a mixture of 40 ml. of pyridine and 7 ml. of acetic anhydride. After standing for 16 hours the mixture was poured out into water and weakly acidified with 2 N $H_2SO_4$. Next it was extracted with methylene chloride. The extract was washed with water until neutral and dried. Evaporation of the solvent at reduced pressure yielded a residue which was taken up in benzene and filtered over 30 g. of $SiO_2$. After recrystallisation from methanol the 3,3-methylene-6$\alpha$-methyl-17$\beta$-acetoxy-$\Delta^4$-oestrene was obtained. In the same manner other 17-esters were prepared derived from valeric acid, capric acid, lauric acid and phenylpropionic acid.

*Example 2*

Of a 1.21 N solution of butyl lithium in ether 49 ml. were added to a vigorously stirred suspension of 23.7 g. of triphenyl methyl phosphoniumbromide in 340 ml. of absolute ether in nitrogen atmosphere. After stirring for four hours at room temperature 40 g. of 3-keto-6$\alpha$-methyl-17$\alpha$-ethyl-17$\beta$-hydroxy-$\Delta^4$-oestrene in 280 ml. of absolute ether were added. Stirring was continued for 18 hours, after which the ether was distilled off while adding tetrahydro furane dropwise. After refluxing for 6 hours the mixture was cooled down and processed as described in Example 1. After filtration in a benzenic solution over 15 g. of $SiO_2$ and recrystallisation from acetone/hexane the residue yielded 1.5 g. of the 3,3-methylene-6$\alpha$-methyl-17$\alpha$-ethyl-17$\beta$-hydroxy-$\Delta^4$-oestrene.

In the same manner the corresponding 3,3-methylene compounds were obtained starting from the 3-keto-6$\alpha$,17$\alpha$-dimethyl-17$\beta$-hydroxy-$\Delta^4$-oestrene and the 3-keto-6$\alpha$-methyl-17$\alpha$-butyl-17$\beta$-hydroxy-$\Delta^4$-oestrene.

*Example 3*

In a mixture of 900 ml. of toluene and 108 ml. of cyclohexanon were dissolved 6.3 g. of 3,3-methylene-6$\alpha$-methyl-17$\beta$-hydroxy-$\Delta^4$-oestrene, after which 150 ml. of toluene were distilled off. Next a solution of 6.0 g. of aluminium-isopropylate in 300 ml. of toluene was added, after which the mixture was refluxed for one and a half hours in nitrogen atmosphere. After the addition of 400 ml. of water and 80 g. of Seignette salt the mixture was subjected to a steam distillation followed by extraction with ether. After washing until neutral and drying of the extract a residue was obtained of 6.3 g. by evaporation of the solvent. After dissolving in benzene, filtration over 65 g. of $SiO_2$ and recrystallisation from hexane 4.1 g. of the 3,3-methylene-6$\alpha$-methyl-17-keto-$\Delta^4$-oestrene were obtained.

*Example 4*

In a flask protected against atmosphere moisture a mixture of 1.2 g. of potassium, 6 ml. of absolute isopropanol and 20 ml. of absolute benzene were refluxed in nitrogen atmosphere till the potassium had dissolved. Next acetylene gas was bubbled through for 3 hours at 0° C. Next 2.0 g. of 3,3-methylene-6$\alpha$-methyl-17-keto-$\Delta^4$-oestrene dissolved in 10 ml. of absolute benzene and 8 ml. of absolute tetrahydrofuran were added, after which stirring took place for 4 hours at room temperature while bubbling through acetylene gas. The mixture was poured out into ice water and next extracted with methylene chloride. The extract was washed with water until neutral and dried. After evaporation of the solvent and recrystallisation of the residue from hexane 1.5 g. of 3,3-methylene-6$\alpha$-methyl-17$\alpha$-ethinyl-17$\beta$-hydroxy-$\Delta^4$ - oestrene were obtained.

In the same manner the desired 17$\alpha$-allyl compound was prepared with allyl-magnesium bromide.

Example 5

Of a 0.94 N solution of ethyl magnesium bromide in ether 26.8 ml. were added to 3.14 g. of 3,3-methylene-6α-methyl-17α-ethyl-17β-hydroxy-Δ⁴-oestrene dissolved in 200 ml. of absolute ether. After 5 minutes 4.2 g. of β-phenyl-propionyl chloride were added. After standing for 16 hours at room temperature the reaction mixture was diluted with water and extracted with methylene chloride. The extract was washed with a saturated solution of sodium bicarbonate and next with water until neutral. After drying the solvent was evaporated at reduced pressure. The residue was dissolved in benzene and filtered over aluminium oxyde to obtain the 3,3-methylene-6α-methyl-17α-ethyl-17β(β-phenyl propionyloxy)-Δ⁴-oestrene.

Example 6

Of a 1.30 N solution of butyl lithium in ether 45 ml. were added to a suspension of 23.1 g. of triphenyl methyl phosphonium bromide in 325 ml. of absolute ether in nitrogen atmosphere. After stirring for 4 hours at room temperature a solution was added of 4.25 g. of 3-keto-6α-methyl-17β-methoxy-17α-ethyl-Δ⁴-oestrene in 80 ml. of absolute tetrahydrofurane and 200 ml. of absolute ether. (The 17-methoxy compound was obtained from the corresponding 17-hydroxy compound by the method described in German patent specification 1,062,698.) Stirring was continued for 16 hours, after which the ether was distilled off while adding THF dropwise. The mixture was boiled for 6 hours and after cooling processed as described in Example 1. After filtration in a benzenic solution over Al₂O₃ the residue was recrystallized from ether/petroleum ether to obtain the 3,3-methylene-6α-methyl-17α-ethyl-17β-methoxy-Δ⁴-oestrene.

Example 7

Twenty-two grams of triphenyl methyl phosphonium bromide were passed into 225 ml. of absolute benzene, after which 150 ml. of benzene were distilled off. Next 70 ml. of a 0.78 N solution of phenyl lithium in absolute ether were added while stirring vigorously in nitrogen atmosphere. After refluxing for 1.5 hours the mixture was cooled down, whereupon 3.5 g. of 3-keto-7α-methyl-17β-hydroxy-Δ⁴-oestrene in 50 ml. of absolute benzene were added. After refluxing for 2.5 hours the mixture was cooled down, poured into ice water and extracted with ether. The extract was washed with water until neutral and dried. After evaporation of the solvent at reduced pressure a residue was obtained to which 250 ml. of 70% methanol were added. Next extraction took place with petroleum ether. After washing with water, drying and evaporation of the solvent this extract yielded 1.5 g. of the 3,3-methylene-7α-methyl-17β-hydroxy-Δ⁴-oestrene.

The thus obtained steroid was dissolved in a mixture of 10 ml. of pyridine and 2 ml. of acetic anhydride and converted into the 3,3-methylene-7α-methyl-17β-acetoxy-Δ⁴-oestrene in the manner as indicated in Example 1.

In the same manner this compound was converted into the 17-esters of butrylic acid, caprylic acid, stearic acid and β-phenyl propionic acid.

Example 8

Twenty-nine grams of triphenyl methyl phosphonium bromide were passed into 330 ml. of absolute benzene, after which 100 ml. of benzene were distilled off. Next 93 ml. of a 0.80 N solution of phenyl lithium in absolute ether were added in nitrogen atmosphere while stirring vigorously. After refluxing for 1.5 hours, the mixture was cooled down and added to a solution of 4.9 g. of 3-keto-7α-methyl-17α-ethyl-17β-hydroxy-Δ⁴-oestrene in 50 ml. of absolute benzene. After refluxing again for 2.5 hours the solution was cooled down, poured into ice water and processed as indicated in Example 7. The crude steroid was taken up in benzene and filtered over 25 g. of Al₂O₃ to obtain the 3,3-methylene-7α-methyl-17α-ethyl-17β-hydroxy-Δ⁴-oestrene in a yield of 1.5 g.

In the same way 3,3-methylene-7α,17α-dimethyl-17β-hydroxy-Δ⁴-oestrene was prepared. Esterification of these compounds yielded the corresponding 17-esters derived from acetic acid, capric acid and β-phenyl propionic acid.

Example 9

In a mixture of 225 ml. of toluene and 27 ml. of cyclohexanone were dissolved 1.6 g. of 3,3-methylene-7α-methyl-17β-hydroxy-Δ⁴-oestrene, after which 70 ml. of toluene were distilled off. Next a solution was added of 1.5 g. of aluminium isopropylate in 75 ml. of toluene, after which the mixture was refluxed for 1.5 hours in nitrogen atmosphere. After the addition of 100 ml. of water and 20 g. of Seignette salt the mixture was subjected to a steam distillation followed by extraction with ether. After washing until neutral and drying of the extract the solvent was evaporated. The residue was taken up in benzene and filtered over 20 g. of Al₂O₃. Obtained after recrystallization from hexane, 0.85 g. of 3,3-methylene-7α-methyl-17-keto-Δ⁴-oestrene.

Example 10

In a flask protected against atmospheric moisture a mixture of 1.3 g. of potassium, 7.5 ml. of absolute isopropanol and 20 ml. of absolute benzene was refluxed in nitrogen atmosphere till the potassium had dissolved. Next dry acetylene gas was bubbled through the mixture for 3 hours at 0° C. After that 2.0 g. of 3,3-methylene-7α-methyl-17-keto-Δ⁴-oestrene dissolved in 15 ml. of absolute benzene and 10 ml. of absolute THF were added. The mixture was stirred again at room temperature for 6 hours while bubbling through acetylene gas. After that the mixture was processed as described in Example 4.

After filtration in a benzenic solution over Al₂O₃ the residue yielded the 3,3-methylene-7α-methyl-17α-ethinyl-17β-hydroxy-Δ⁴-oestrene.

Example 11

In 125 ml. of absolute ether were disssolved 1.58 g. of 3,3 - methylene - 7α-methyl - 17α - ethyl-17β-hydroxy-Δ⁴-oestrene. Next 14 ml. of a 0.89 N solution of ethyl magnesium bromide in ether were added. After 5 minutes 0.88 ml. of acetyl chloride was added. After standing overnight at room temperature the mixture was processed as described in Example 5. The residue was dissolved in benzene and filtered over Al₂O₃ to obtain the 3,3-methylene-7α-methyl-17α-ethyl-17β-acetoxy-Δ⁴-oestrene.

In the same manner the 17-esters have been prepared derived from capronic acid, capric acid and β-phenyl propionic acid.

Example 12

Of a 1.21 N solution of butyl lithium in ether 34 ml. were added to a suspension of 16.5 g. of triphenyl phosphonium bromide in 230 ml. of absolute ether in nitrogen atmosphere. After stirring for 4 hours at room temperature a solution was added of 3.0 g. of 3-keto-7α-methyl-17α-ethyl-17β-methoxy-Δ⁴-oestrene in 60 ml. of absolute THF and 100 ml. of absolute ether. Stirring was continued for 16 hours, after which the ether was distilled off while adding THF dropwise. The mixture was boiled for 5 hours and after cooling processed as described in Example 1. After filtration in a benzenic solution over Al₂O₃ the residue yielded the 3,3-methylene-7α-17α-ethyl-17β-methoxy-Δ⁴-oestrene.

Example 13

In the manner as described in Example 10 3,3-methylene-7α-methyl-17-keto-Δ⁴-oestrene was converted into the corresponding 17β-hydroxy-17α-allyl-, and 17β-hydroxy-17α-methallyl compounds.

I claim:

1. Δ⁴ - 3,3 - methylene - 7α,17α-dimethyl-17β-hydroxy-oestrene.

2. Δ⁴ - 3,3 - methylene - 7α - methyl - 17β-hydroxy-17α-ethyl-oestrene.

3. $\Delta^4$ - 3,3 - methylene - $7\alpha$ - methyl - $17\beta$-hydroxy-$17\alpha$-ethinyl-oestrene.

4. Steroids of the formula:

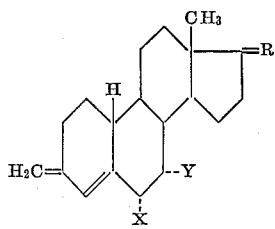

wherein R is selected from the group consisting of keto and $R_3(\alpha R_4)$, in which $R_3$ is selected from the group consisting of hydroxy, acyloxy and alkyloxy, in which the acyl is derived from an organic carboxylic acid having 1–18 carbon atoms and $R_4$ is selected from the group consisting of hydrogen, alkyl, alkenyl and alkynyl each having 1–4 carbon atoms, and X and Y are selected from the group consisting of hydrogen and alkyl in which X and Y are not simultaneously hydrogen nor simultaneously alkyl.

5. Steroids of the formula:

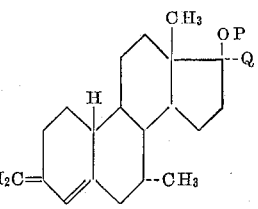

wherein P is selected from the group consisting of hydrogen, acyl and alkyl, in which acyl is derived from an organic carboxylic acid having 1–18 carbon atoms, and Q is selected from the group consisting of hydrogen and alkyl, alkenyl and alkynyl each having 1–4 carbon atoms.

References Cited by the Examiner

Irmscher et al., "Jour. Med. Chem.," May 1964, No. 7, page 346 (relied on).

ELBERT L. ROBERTS, *Primary Examiner.*